United States Patent
Yin et al.

(10) Patent No.: US 9,505,417 B2
(45) Date of Patent: Nov. 29, 2016

(54) FOLDING TABLE AND CHAIR DEVICE

(71) Applicant: Wan-Yu Li, Taipei (TW)

(72) Inventors: Qing-Kun Yin, Sichuan Province (CN); Chin-Chen Chang, Taipei (TW)

(73) Assignee: Wan-Yu Li, Taipei (TW)

( * ) Notice: Subject to any disclaimer, the term of this patent is extended or adjusted under 35 U.S.C. 154(b) by 25 days.

(21) Appl. No.: 14/640,310

(22) Filed: Mar. 6, 2015

(65) Prior Publication Data

US 2016/0257313 A1    Sep. 8, 2016

(51) Int. Cl.
*A47C 13/00* (2006.01)
*B60N 2/32* (2006.01)
*B61D 33/00* (2006.01)

(52) U.S. Cl.
CPC ......... *B61D 33/0007* (2013.01); *B61D 33/005* (2013.01); *B61D 33/0021* (2013.01)

(58) Field of Classification Search
CPC .......... B61D 33/0007; B61D 33/0021; B61D 33/005
USPC ....... 297/63, 64, 65, 88, 119, 118, 147, 152, 297/157.1
See application file for complete search history.

(56) References Cited

U.S. PATENT DOCUMENTS

| | | | | |
|---|---|---|---|---|
| 134,691 A * | 1/1873 | Martindale | ............ | A47C 13/00 297/119 |
| 1,470,004 A * | 10/1923 | Gahm | ............ | B60N 2/34 297/326 |
| 2,502,061 A * | 3/1950 | Radford | ............ | B60N 2/3013 296/156 |
| 2,754,890 A * | 7/1956 | Rubin | ............ | A47C 17/2073 297/403 |
| 4,065,174 A * | 12/1977 | Yokohama | ............ | B60N 2/32 296/69 |
| 4,085,962 A * | 4/1978 | Wahls | ............ | B60N 2/34 296/65.13 |
| 4,372,604 A * | 2/1983 | Raksanyi | ............ | B61D 33/005 297/145 |
| 4,376,552 A * | 3/1983 | Pilhall | ............ | B60N 2/3013 296/69 |
| 4,669,780 A * | 6/1987 | Sakakibara | ............ | B60N 2/0232 296/64 |
| 4,685,719 A * | 8/1987 | Hanemaayer | ............ | B60P 3/36 296/156 |
| 5,882,070 A * | 3/1999 | Genn | ............ | A47B 97/04 248/461 |
| 6,209,952 B1 * | 4/2001 | Huang | ............ | A47B 39/00 297/143 |
| 6,441,576 B1 * | 8/2002 | Marin-Martinod | .. | B60N 2/0232 297/327 |
| 2015/0158400 A1 * | 6/2015 | Yin | ............ | B60N 2/34 297/67 |

FOREIGN PATENT DOCUMENTS

| | | |
|---|---|---|
| CN | 1197623 A | 11/1998 |
| CN | 202623992 U | 12/2012 |
| DE | 19748793 C1 | 8/1999 |
| GB | 2433433 A | 6/2007 |
| GB | 2438162 A | 11/2007 |
| JP | H03-124950 U | 12/1991 |
| JP | H05-3031 U | 1/1993 |
| JP | 2014-432581 A | 12/2014 |
| JP | 2015-20739 A | 2/2015 |

* cited by examiner

*Primary Examiner* — Jose V Chen
(74) *Attorney, Agent, or Firm* — Rosenberg, Klein & Lee

(57) ABSTRACT

A folding table and chair device has a chair assembly and a table assembly. The chair assembly has a supporting bracket, a seat mounted securely on a top of the supporting bracket, a backrest mounted pivotally on a rear end of the seat, and a footrest mounted pivotally on a front end of the seat and being capable of pivoting forward to a horizontal position. The table assembly is mounted in front of the chair assembly and has a wall board mounted in front of the chair assembly, and a folding table mounted pivotally on the rear of the wall board and being capable of pivoting downward to a horizontal position. The folding table and chair device allows a user to lie completely down thereon.

10 Claims, 7 Drawing Sheets

FOLDING TABLE AND CHAIR DEVICE

BACKGROUND OF THE INVENTION

1. Field of the Invention

The present invention relates to a table and chair device, and more particularly to a folding table and chair device that is capable of changing to chairs, deck chairs or a set of a table and chairs for multiple activities such as sitting, lying, dining or reading.

2. Description of Related Art

Conventional chairs in trains or high speed trains are arranged tandem. The backrest of each chair has a flippable table mounted on a rear side of the backrest and being able to pivot downward as a dining table or a desk so that a passenger sitting behind on another chair is able to put foods or other items on the table. Furthermore, a footrest plate is mounted under each chair so that the passenger can put feet on the footrest plate to prevent foot fatigue due to suspension.

However, the aforementioned chairs in tandem arrangement do not allow the passenger to lie down completely.

To overcome the shortcomings, the present invention provides a folding table and chair device to mitigate or obviate the aforementioned problems.

SUMMARY OF THE INVENTION

The main objective of the invention is to provide a folding table and chair device that is capable of changing to chairs, deck chairs or a set of a table and chairs for multiple activities such as sitting, lying, dining or reading.

A folding table and chair device in accordance with the present invention comprises a chair assembly and a table assembly. The chair assembly has a supporting bracket, a seat mounted securely on a top of the supporting bracket, a backrest mounted pivotally on a rear end of the seat, and a footrest mounted pivotally on a front end of the seat and being capable of pivoting forward to a horizontal position. The table assembly is mounted in front of the chair assembly and has a wall board mounted in front of the chair assembly, and a folding table mounted pivotally on the rear of the wall board and being capable of pivoting downward to a horizontal position. The folding table and chair device allows a user to lie down completely thereon.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
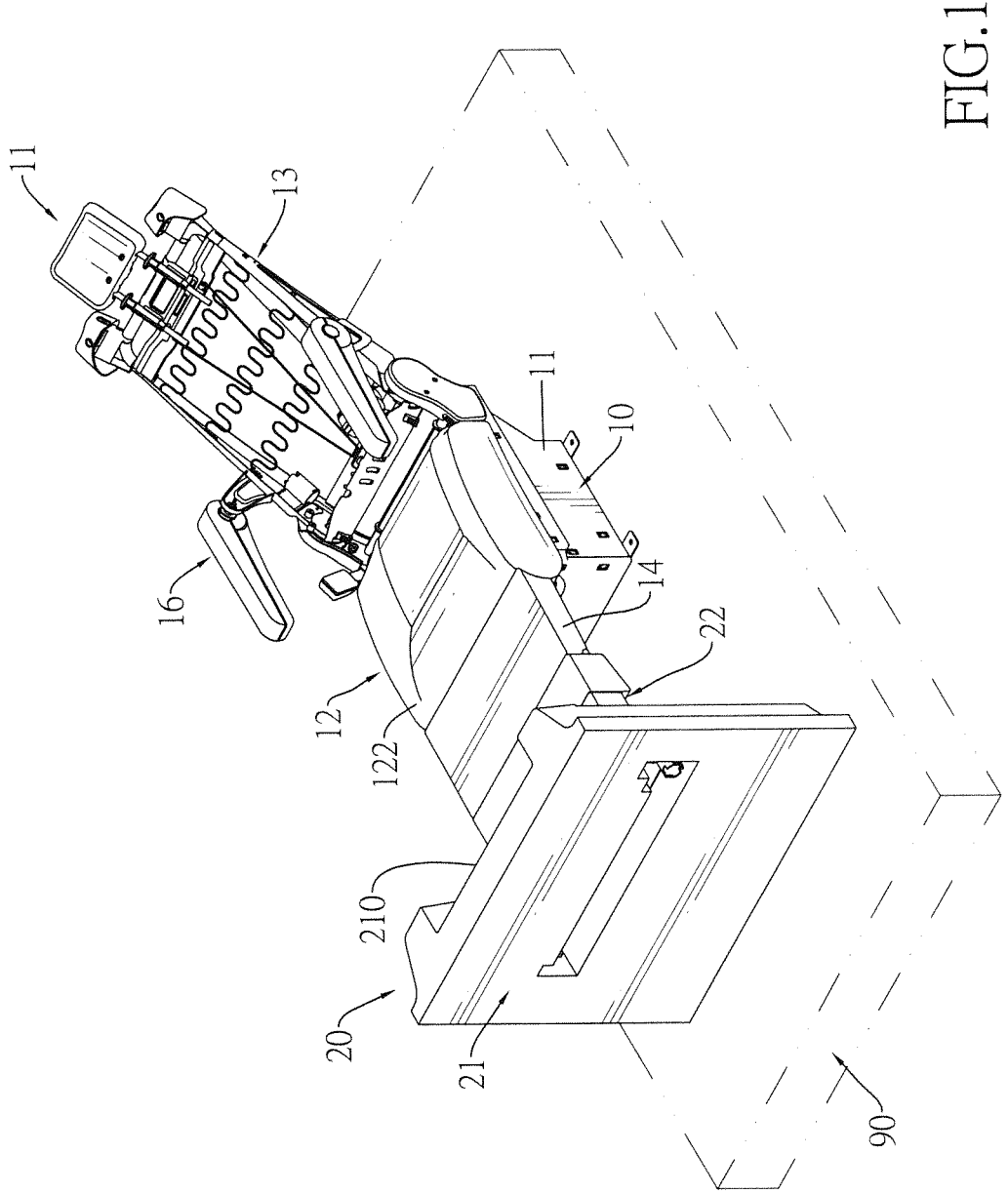
FIG. 1 is a perspective view of a folding table and chair device in accordance with the present invention.
Figure 2:
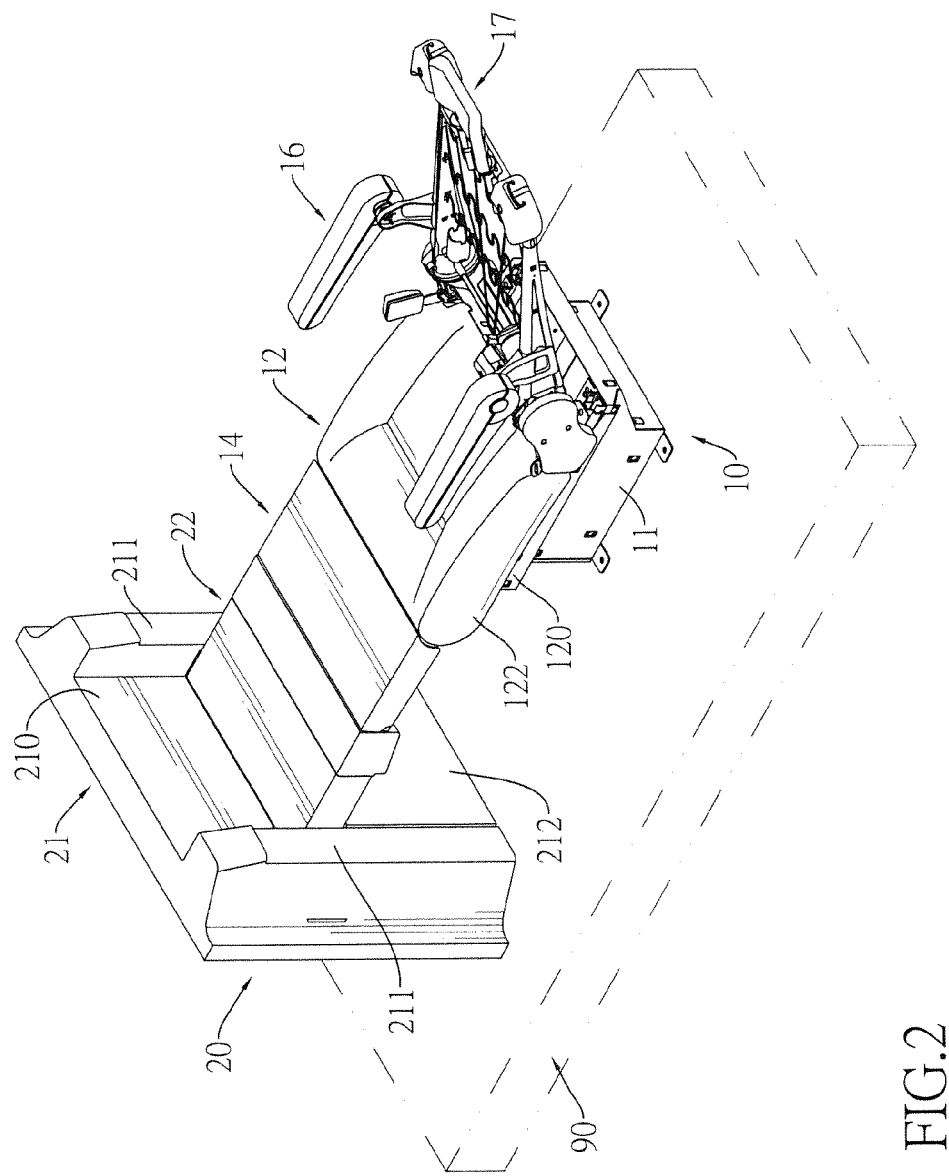
FIG. 2 is another perspective view of the folding table and chair device in FIG. 1.

With reference to FIGS. 1 and 2, a folding table and chair device in accordance with the present invention may be mounted in an internal space of a train or an automobile and comprises a bottom board 90, a chair assembly 10 and a table assembly 20.

Figure 3:
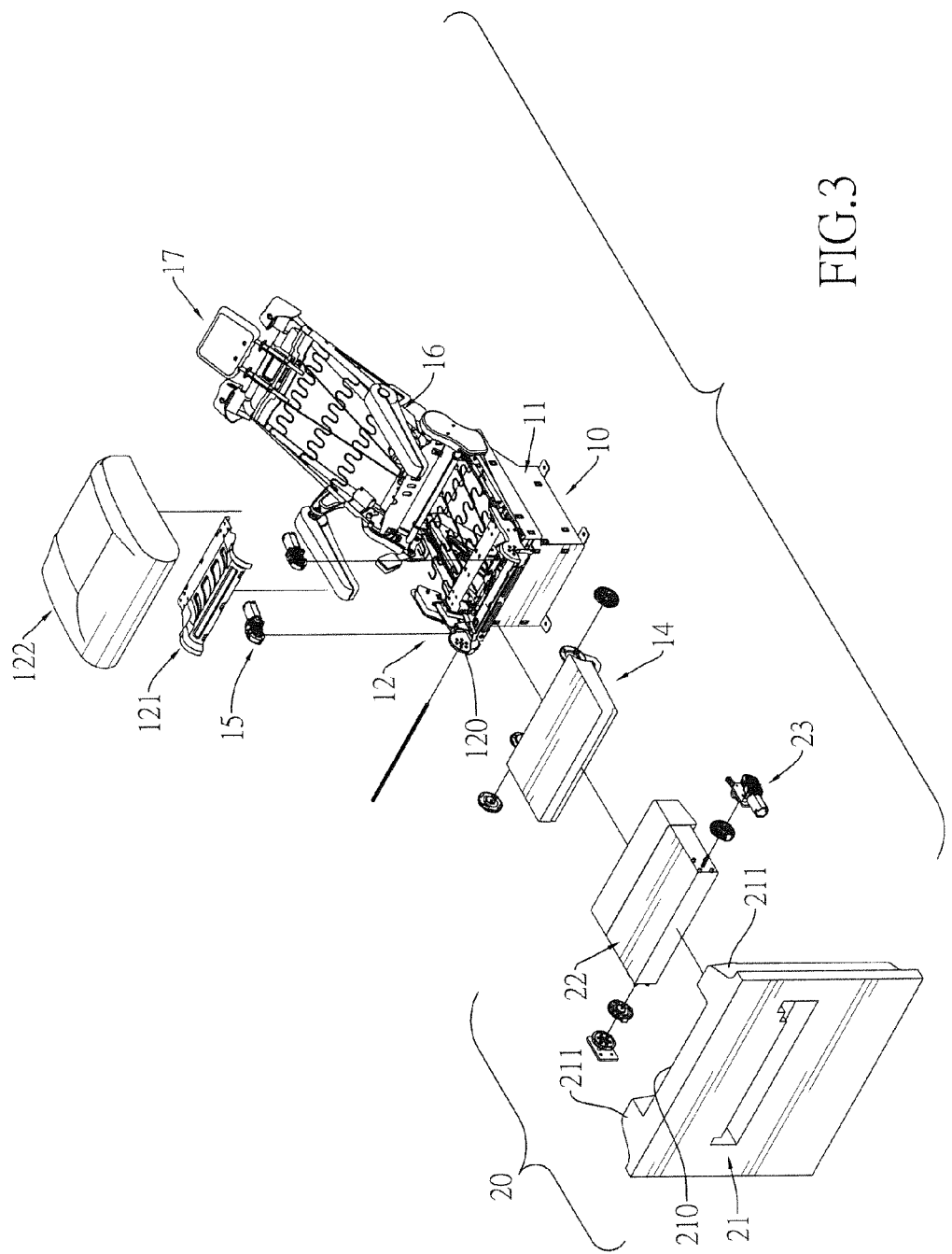
FIG. 3 is an exploded perspective view of the folding table and chair device in FIG. 1.
Figure 4:
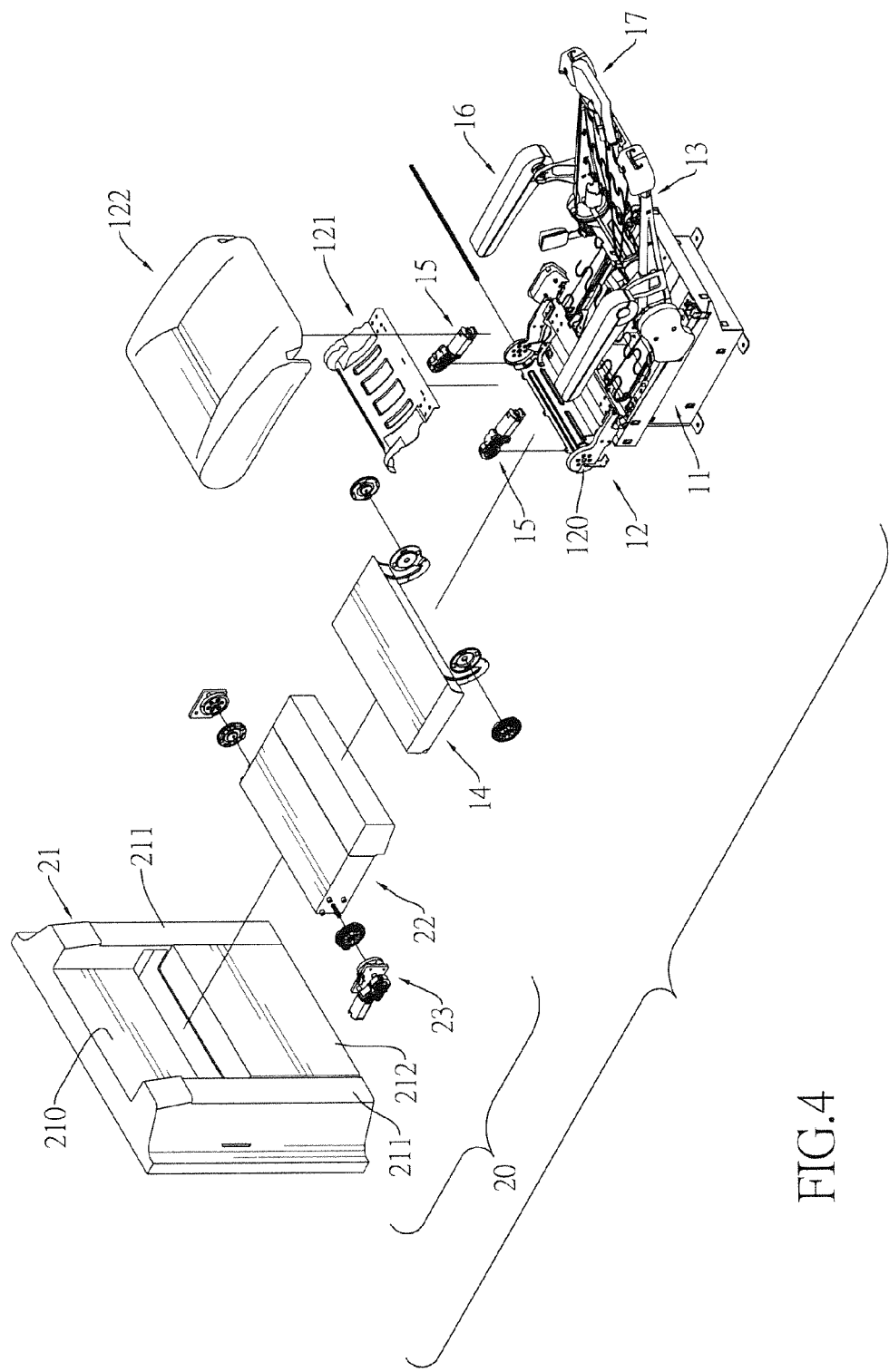
FIG. 4 is another exploded perspective view of the folding table and chair device in FIG. 3.

With further reference to FIGS. 3 and 4, the bottom board 90 may be mounted in the internal space of the train or the automobile. Alternatively, the bottom board 90 may be a floor in the train or the automobile.

The chair assembly 10 is mounted on the bottom board 90 and has a supporting bracket 11, a seat 12, a backrest 13, a footrest 14, two armrests 16 and a headrest 17.

The supporting bracket 11 is mounted securely on the bottom board 90.

The seat 12 is mounted securely on a top of the supporting bracket 11 and has a casing 120, a cover 121 and a cushioning pad 122. The casing 120 has a cavity defined therein to accommodate a printed circuit board, wires and other internal components. The cover 121 is mounted on the casing 120 and covers the cavity. The cushioning pad 122 is mounted on the cover 121.

The backrest 13 is mounted pivotally on a rear end of the seat 12.

The footrest 14 is mounted pivotally on a front end of the seat 12 and is capable of pivoting forward to a horizontal position.

The armrests 16 are pivotally mounted respectively on two opposite sides of the backrest 13.

The headrest 17 is mounted on atop end of the backrest 13.

The table assembly 20 is mounted on the bottom board 90 in front of the chair assembly 10 and has a wall board 21 and a folding table 22.

The wall board 21 is mounted on the bottom board 90 in front of the chair assembly 10 and has a rear side, two opposite rails 211, a receiving slot 210, and a positioning stopper 212. The rear side of the wall board 21 faces toward the front end of the seat 12. The rails 211 are formed on the rear side of the wall board 21. The receiving slot 210 is defined in the rear side of the wall board 21 between the rails 211. The positioning stopper 212 is formed on the rear side of the wall board 21 between the rails 211 and is disposed under the receiving slot 210.

The folding table 22 is mounted pivotally on the rear side of the wall board 21 between the rails 211, is disposed above the positioning stopper 212, and is capable of pivoting upward into the receiving slot 210 or pivoting downward to a horizontal position. Furthermore, when the folding table 22 pivots downward, the positioning stopper 212 supports the folding table 22 and limits a lowest position of the folding table 22 at the horizontal position.

Figure 5:
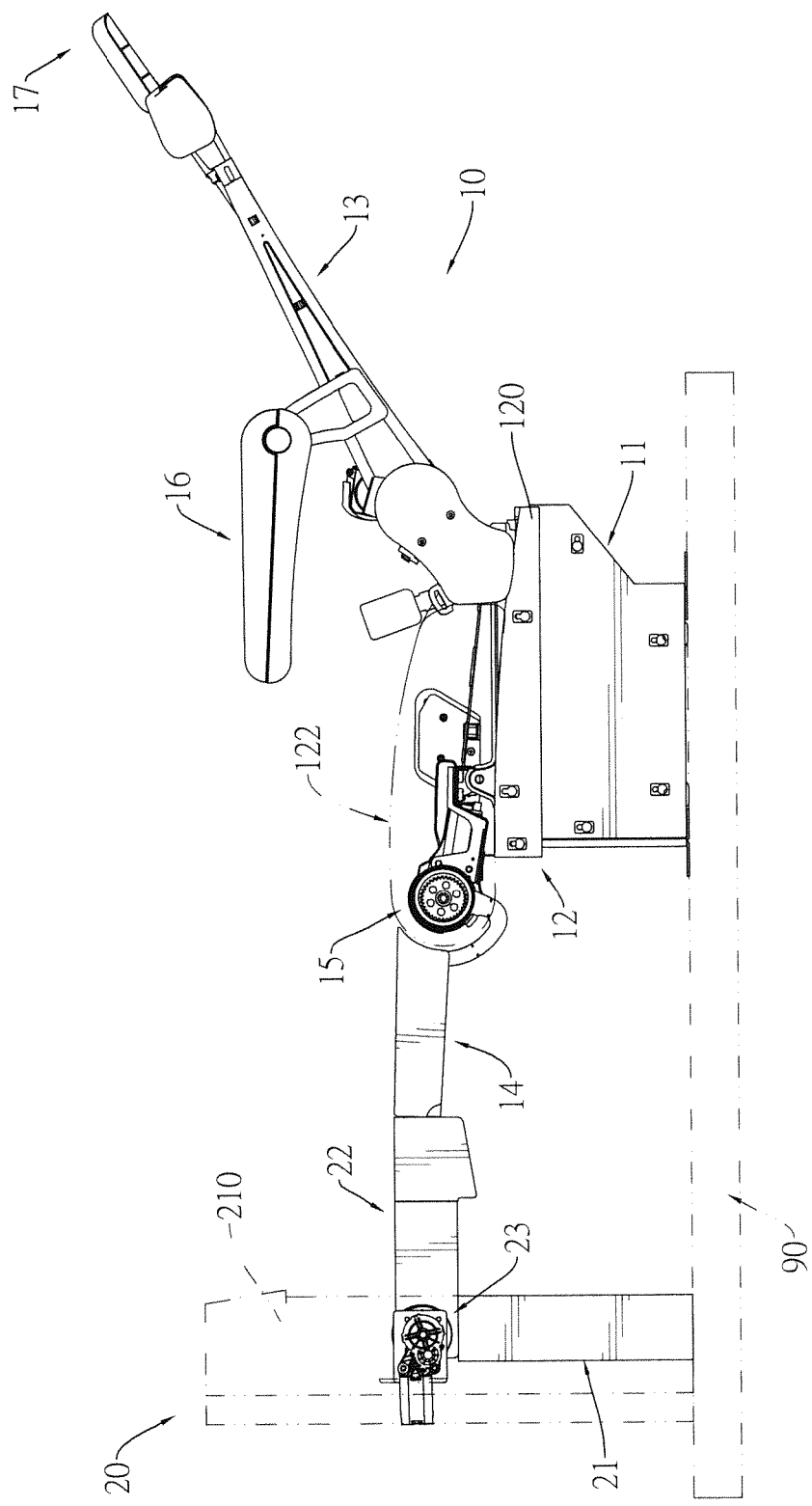
FIG. 5 is a side view of the folding table and chair device in FIG. 1.

With further reference FIG. 5, when both pivoting to the horizontal positions, the footrest 14 and the folding table 22 contact and align with each other to form a bed to allow a user to lie completely down on the bed.

Figure 6:
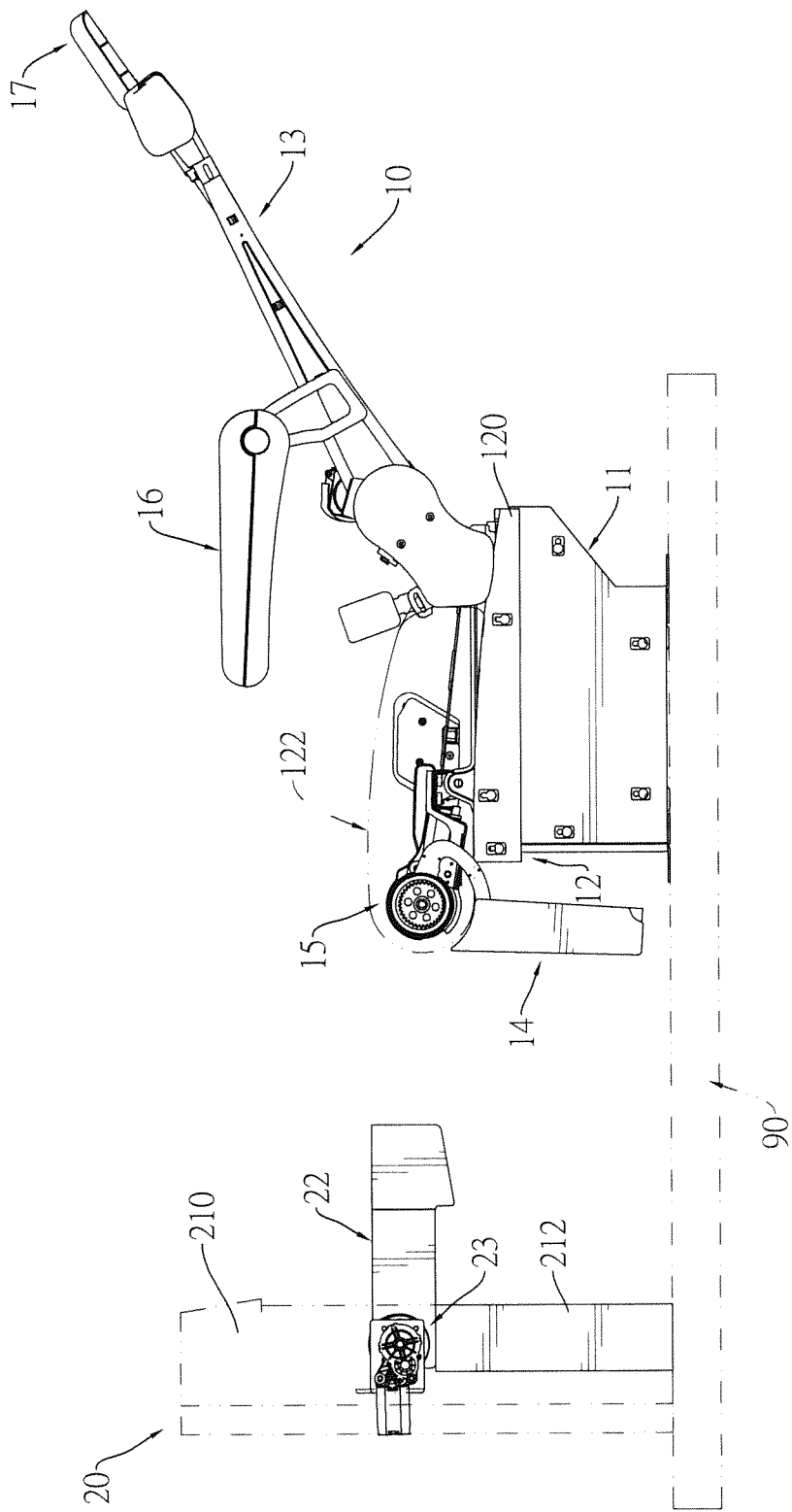
FIG. 6 is an operational side view of the folding table and chair device in FIG. 5.

With further reference FIG. 6, when the footrest 14 pivots downward to a vertical position and the folding table 22 pivots downward to the horizontal position, the folding table 22 serves as a dining table or a desk.

Figure 7:
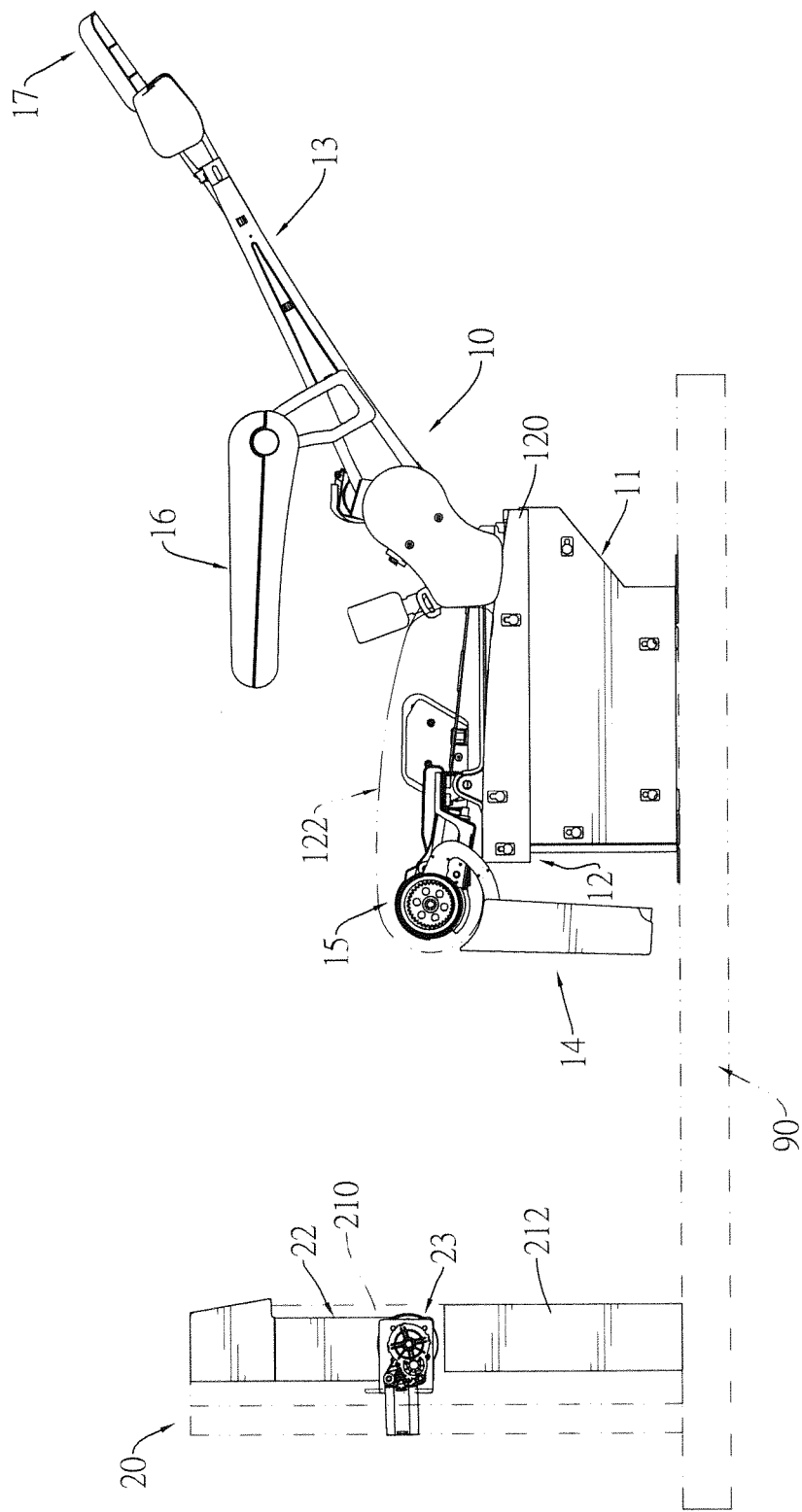
FIG. 7 is another operational side view of the folding table and chair device in FIG. 5.

With further reference FIG. 7, the folding table 22 may be retracted into the receiving slot 210 to enlarge the space in front of the chair assembly 10.

In a preferred embodiment, the chair assembly 10 further has at least one transmission motor 15 mounted between the seat 12 and the footrest 14 to drive and pivot the footrest 14. Alternatively, two transmission motors 15 are mounted respectively on two opposite sides of the seat 12 and connected respectively to two opposite sides of the footrest 14.

In a preferred embodiment, the table assembly 20 further has at least one driving motor 23 mounted between at least one of the rails 211 and the folding table 22 to drive and pivot the folding table 22. Alternatively, two driving motors 23 may be mounted respectively on the rails 211 and connected respectively to two opposite sides of the folding table 22.

The footrest 14 of the chair assembly 10 and the folding table 22 of the table assembly 20 are able to pivot to the horizontal positions and combine together to form a bed so that a passenger is allowed to lie completely down on the bed. The footrest 14 pivoting to a non-vertical position allows the passenger to rest feet thereon and prevent fatigue. The folding table 22 pivoting to the horizontal position serves as a dining table or a desk so that the passenger is able to eat foods, read books or put personal item thereon.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A folding table and chair device comprising:
   a chair assembly having
      a supporting bracket;
      a seat mounted securely on a top of the supporting bracket;
      a backrest mounted pivotally on a rear end of the seat; and
      a footrest mounted pivotally on a front end of the seat and being capable of pivoting forward to a horizontal position; and
   a table assembly mounted in front of the chair assembly and having
      a wall board mounted in front of the chair assembly and having a rear side, and the rear side of the wall board facing toward the front end of the seat; and
      a folding table mounted pivotally on the rear side of the wall board and being capable of pivoting downward to a horizontal position;
   wherein when the footrest pivots forward to the horizontal position and the folding table pivots downward to the horizontal position, the footrest and the folding table contact and align with each other.

2. The folding table and chair device as claimed in claim 1, wherein
   the wall board further has
      two rails formed on the rear side of the wall board; and
      a receiving slot defined in the rear side of the wall board between the rails; and
   the folding table is mounted between the rails of the wall board and is capable of pivoting upward into the receiving slot.

3. The folding table and chair device as claimed in claim 2, wherein the wall board further has a positioning stopper formed on the rear side of the wall board between the rails and disposed below the receiving slot of the wall board; and
   wherein when the folding table pivots downward, the positioning stopper supports the folding table and limits a lowest position of the folding table at the horizontal position.

4. The folding table and chair device as claimed in claim 3, wherein the chair assembly further has at least one transmission motor mounted between the seat and the footrest to drive and pivot the footrest.

5. The folding table and chair device as claimed in claim 4, wherein two transmission motors are mounted respectively on two opposite sides of the seat and connected respectively to two opposite sides of the footrest.

6. The folding table and chair device as claimed in claim 4, wherein the table assembly further has at least one driving motor mounted between at least one of the rails and the folding table to drive and pivot the folding table.

7. The folding table and chair device as claimed in claim 6, wherein two driving motors may be mounted respectively on the rails and connected respectively to two opposite sides of the folding table.

8. The folding table and chair device as claimed in claim 3, wherein the chair assembly further has
   two armrests pivotally mounted respectively on two opposite sides of the backrest; and
   a headrest mounted on a top end of the backrest.

9. The folding table and chair device as claimed in claim 3, wherein the seat has
   a casing having a cavity defined therein; and
   a cover mounted on the casing and covering the cavity.

10. The folding table and chair device as claimed in claim 3, wherein the chair assembly and the table assembly are mounted on a bottom board.

\* \* \* \* \*